United States Patent
Chen et al.

(10) Patent No.: US 10,325,701 B1
(45) Date of Patent: Jun. 18, 2019

(54) OVER-CURRENT PROTECTION DEVICE

(71) Applicant: Fuzetec Technology Co., Ltd., New Taipei (TW)

(72) Inventors: Jack Jih-Sang Chen, New Taipei (TW); Chang-Hung Jiang, New Taipei (TW)

(73) Assignee: Fuzetec Technology Co., Ltd., New Taipei (TW)

( * ) Notice: Subject to any disclaimer, the term of this patent is extended or adjusted under 35 U.S.C. 154(b) by 0 days.

(21) Appl. No.: 16/142,054

(22) Filed: Sep. 26, 2018

(51) Int. Cl.
| | |
|---|---|
| *H01C 1/14* | (2006.01) |
| *H01C 7/02* | (2006.01) |
| *C08L 23/26* | (2006.01) |
| *H01C 17/28* | (2006.01) |

(52) U.S. Cl.
CPC ............. *H01C 1/14* (2013.01); *C08L 23/26* (2013.01); *H01C 7/021* (2013.01); *H01C 17/28* (2013.01); *C08L 2205/02* (2013.01); *C08L 2207/062* (2013.01)

(58) Field of Classification Search
CPC .......... H01C 1/14; H01C 7/021; H01C 7/027; H01C 17/28
See application file for complete search history.

(56) References Cited

U.S. PATENT DOCUMENTS

| | | | | |
|---|---|---|---|---|
| 7,382,224 B2* | 6/2008 | Wang | ...................... | H01C 7/027 219/548 |
| 8,368,504 B1* | 2/2013 | Chen | ........................ | H01C 7/02 252/511 |
| 8,558,655 B1* | 10/2013 | Chen | ....................... | H01C 7/027 338/13 |
| 9,455,075 B1* | 9/2016 | Chen | ....................... | H01C 7/027 |
| 9,502,163 B2* | 11/2016 | Chen | ....................... | H01C 7/027 |
| 9,773,589 B1* | 9/2017 | Chen | ....................... | H01C 7/028 |
| 2015/0235744 A1* | 8/2015 | Chen | ....................... | H01C 7/027 338/22 R |

* cited by examiner

*Primary Examiner* — Kyung S Lee
(74) *Attorney, Agent, or Firm* — Hammer & Associates, P.C.

(57) ABSTRACT

An over-current protection device includes first and second electrodes, and a positive temperature coefficient multilayered structure including first, second, and third polymer layers. The first polymer layer is bonded to the first electrode and includes a polymer matrix made from a polymer composition containing a grafted olefin-based polymer. The second polymer layer has a through hole and includes a polymer matrix made from a polymer composition containing a non-grafted olefin-based polymer and substantially free of a grafted olefin-based polymer. The third polymer layer is bonded to the second electrode and includes a polymer matrix made from a polymer composition containing a grafted olefin-based polymer.

13 Claims, 5 Drawing Sheets

OVER-CURRENT PROTECTION DEVICE

FIELD

The disclosure relates to an over-current protection device, and more particularly to an over-current protection device including three polymer layers, one of which includes a polymer matrix made from a polymer composition containing a non-grafted olefin-based polymer, being substantially free of a grafted olefin-based polymer and including at least one through hole, and others include a polymer matrix made from a polymer composition containing a grafted olefin-based polymer.

BACKGROUND

Figure 1:
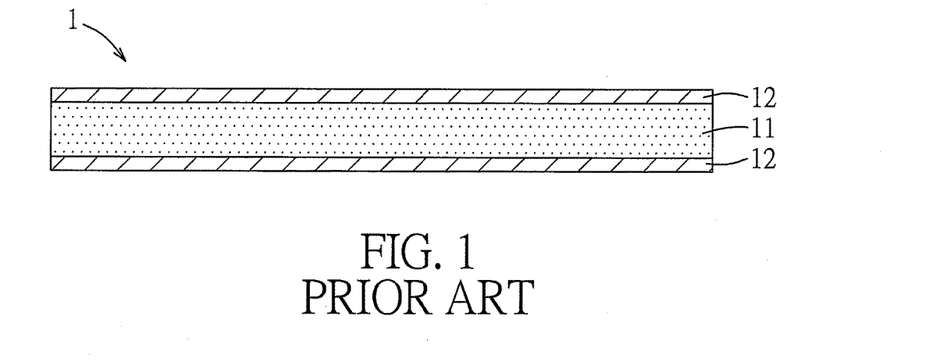
FIG. 1 is a schematic cross-sectional view of a conventional over-current protection device.

Referring to FIG. 1, positive temperature coefficient (PTC) over-current protection device exhibits a PTC effect that renders the same to be useful as a circuit protection device 1. A conventional circuit protection device 1 includes a PTC polymer layer 11 and two electrodes 12 attached to two opposite surfaces of the PTC polymer layer 11. The PTC polymer layer 11 includes a polymer matrix that contains a crystalline region and a non-crystalline region, and a particulate conductive filler dispersed in the non-crystalline region of the polymer matrix and is formed into a continuous conductive path for electrical conduction between the electrodes 12. The PTC effect is a phenomenon that, when the temperature of the polymer matrix is raised to its melting point, crystals in the crystalline region start melting and results in generation of a new non-crystalline region. As the new non-crystalline region is increased to a certain extent and merges with the original non-crystalline region, the conductive path of the particulate conductive filler will become discontinuous and resistance of the PTC polymer material will increase rapidly, thereby resulting in electrical disconnection between the electrodes.

The circuit protection device is used for protecting an electronic apparatus, and the polymer matrix of the PTC polymer layer 11 is selected based on an operating current and an operating voltage of the electronic apparatus. The polymer matrix of the PTC polymer layer 11 is usually made from a polyethylene-based composition. However, the circuit protection device might not have desired electrical conductivity due to a relatively poor adhesion between the PTC polymer layer 11 and the electrodes 12.

U.S. Pat. No. 6,238,598 discloses a PTC polymer blend composition and a circuit protection device. The PTC polymer blend composition includes a non-grafted polyolefin, a grafted polyolefin, and a conductive particulate material. The circuit protection device includes a PTC element having the PTC polymer blend composition and two electrodes respectively connected to two opposite sides of the PTC element. With inclusion of the grafted polyolefin in the PTC polymer blend composition, the circuit protection device has a relatively good electrical stability and good adhesion between the PTC element and the electrodes.

However, volume resistance of the circuit protection device disclosed in U.S. Pat. No. 6,238,598 is not lower than 0.15 ohm-cm. The volume resistance may be reduced (e.g., close to 0.1 ohm-cm) by virtue of excluding the grafted polyolefin from the PTC polymer blend composition. However, peel strength between the electrodes and the PTC element may become lower than 0.4 kG/cm$^2$. As a consequence, the PTC element and the electrodes may be easily separated from each other, thereby resulting in malfunction of the over-current protection device.

In view of the foregoing, there is a need for manufacturing an over-current protection device with desired conductivity and good adhesion.

SUMMARY

Therefore, an object of the disclosure is to provide an over-current protection device that can alleviate at least one of the drawbacks of the prior art.

According to one aspect of the disclosure, an over-current protection device includes first and second electrodes, and a positive temperature coefficient (PTC) multilayered structure.

The PTC multilayered structure is disposed between the first and second electrodes and includes a first polymer layer, a second polymer layer, and a third polymer layer.

The first polymer layer is bonded to the first electrode and includes a first polymer matrix and a first particulate conductive filler dispersed in the first polymer matrix. The first polymer matrix is made from a first polymer composition.

The second polymer layer is bonded to the first polymer layer and includes a second polymer matrix and a second particulate conductive filler dispersed in the second polymer matrix. The second polymer matrix is made from a second polymer composition. The second polymer layer includes at least one through hole.

The third polymer layer is bonded to and disposed between the second polymer layer and the second electrode, and includes a third polymer matrix and a third particulate conductive filler dispersed in the third polymer matrix. The third polymer matrix is made from a third polymer composition.

The second polymer composition contains a non-grafted olefin-based polymer and is substantially free of a grafted olefin-based polymer.

Each of the first and third polymer compositions contains a grafted olefin-based polymer.

According to the other aspect of the disclosure, an over-current protection device includes first and second electrodes, and a PTC multilayered structure.

The PTC multilayered structure is disposed between the first and second electrodes, and includes a first polymer layer, a second polymer layer, and a third polymer layer.

The first polymer layer is bonded to the first electrode, and includes a first polymer matrix and a first particulate conductive filler dispersed in the first polymer matrix. The first polymer matrix is made from a first polymer composition.

The second polymer layer is bonded to the first polymer layer, and includes a second polymer matrix and a second particulate conductive filler dispersed in the second polymer matrix. The second polymer matrix is made from a second polymer composition.

The third polymer layer is bonded to and disposed between the second polymer layer and the second electrode, and includes a third polymer matrix and a third particulate conductive filler dispersed in the third polymer matrix. The third polymer matrix is made from a third polymer composition.

The second polymer composition contains a non-grafted olefin-based polymer and is substantially free of a grafted olefin-based polymer.

Each of the first and third polymer compositions contains a grafted olefin-based polymer.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
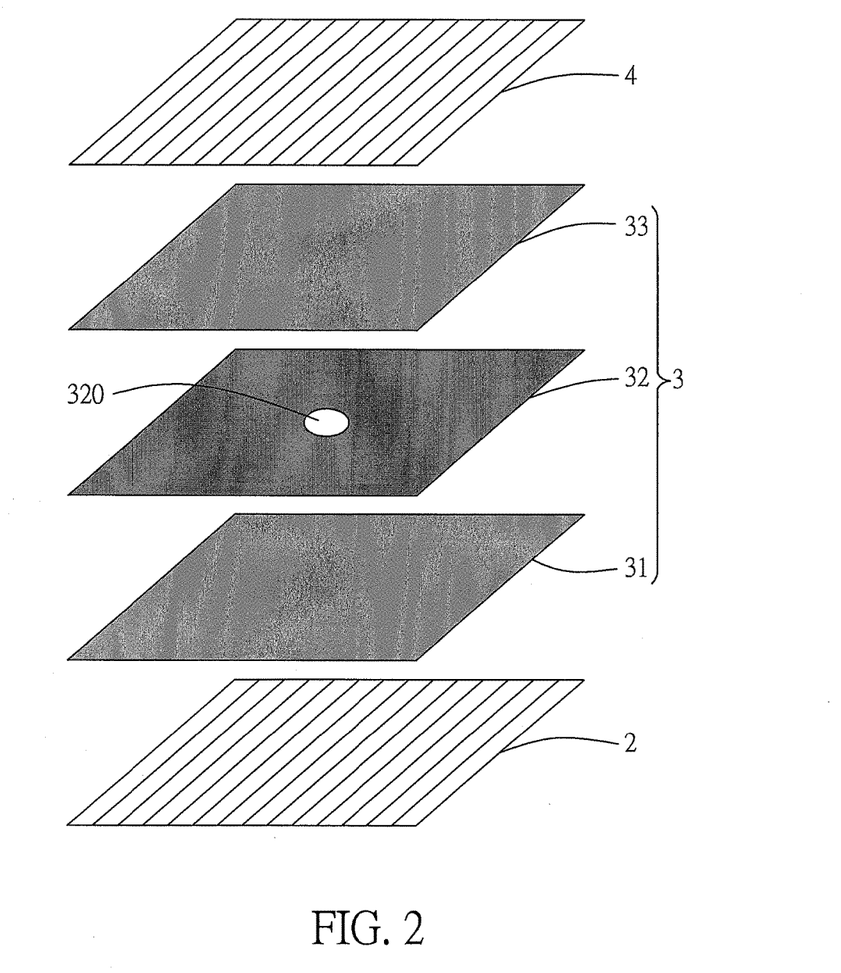
FIG. 2 is an exploded perspective view illustrating a first embodiment of the over-current protection device.

Referring to FIG. 2, a first embodiment of an over-current protection device includes a first electrode 2, a second electrode 4, and a positive temperature coefficient (PTC) multilayered structure 3 disposed between the first and second electrodes 2, 4.

The PTC multilayered structure 3 includes a first polymer layer 31, a second polymer layer 32, and a third polymer layer 33.

The first polymer layer 31 is bonded to the first electrode 2, and includes a first polymer matrix and a first particulate conductive filler that is dispersed in the first polymer matrix. The first polymer matrix is made from a first polymer composition.

The second polymer layer 32 is bonded to the first polymer layer 31, and includes a second polymer matrix and a second particulate conductive filler that is dispersed in the second polymer matrix. The second polymer matrix is made from a second polymer composition. More specifically, the second polymer layer 32 may further include at least one through hole 320. The through hole 320 has a diameter (d) ranging from 0.8 mm to 1.20 mm, and an area ranging from 0.5024 mm$^2$ to 1.1304 mm$^2$.

The third polymer layer 33 is bonded to and disposed between the second polymer layer 32 and the second electrode 4. The third polymer layer 33 includes a third polymer matrix and a third particulate conductive filler that is dispersed in the third polymer matrix. The third polymer matrix is made from a third polymer composition.

The second polymer composition contains a non-grafted olefin-based polymer and is substantially free of a grafted olefin-based polymer.

More specifically, the non-grafted olefin-based polymer of the second polymer composition is high density polyethylene (HDPE).

In certain embodiments, the second polymer layer 32 disposed between the first polymer layer 31 and the third polymer layer 33 may be a multilayered structure and may include a plurality of layered portions that are stacked from one another in a direction extending from the first polymer layer 31 toward the third polymer layer 33. The layered portions of the second polymer layer 32 are optionally made from the identical or different materials.

Each of the first and third polymer compositions contains a grafted olefin-based polymer.

More specifically, the grafted olefin-based polymer of each of the first and third polymer compositions includes an unsaturated carboxylic acid grafted polyolefin. Hence, the over-current protective device including the aforementioned PTC multilayered structure may be also known as a cocktail type over-current protective device.

In certain embodiments, the first polymer composition further includes a non-grafted olefin-based polymer. The non-grafted olefin-based polymer of the first polymer composition may be high density polyethylene (HDPE).

In certain embodiments, the third polymer composition further includes a non-grafted olefin-based polymer. The non-grafted olefin-based polymer of the third polymer composition may be high density polyethylene (HDPE).

In certain embodiments, the grafted olefin-based polymer of the first polymer composition is present in an amount ranging from 25 wt % to 100 wt % based on 100 wt % of the first polymer composition. The grafted olefin-based polymer of the third polymer composition is present in an amount ranging from 25 wt % to 100 wt % based on 100 wt % of the third polymer composition.

Examples of each of the first, second and third particulate conductive fillers include carbon black, a metallic powder, a conductive ceramic powder, and combinations thereof.

In certain embodiments, the first, second and third particulate conductive fillers are carbon black.

Figure 3:
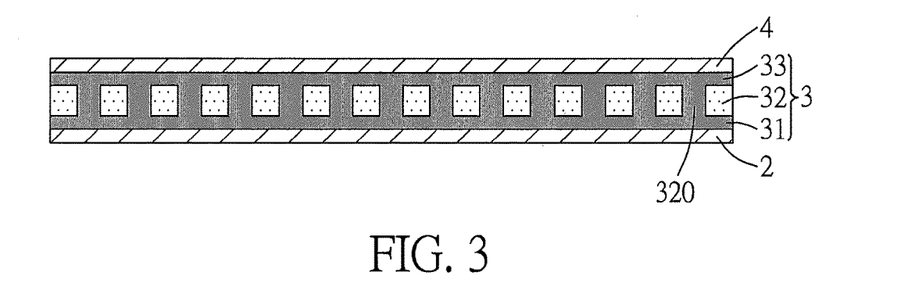
FIG. 3 is a schematic cross-sectional view illustrating a second embodiment of the over-current protection device.
Figure 4:
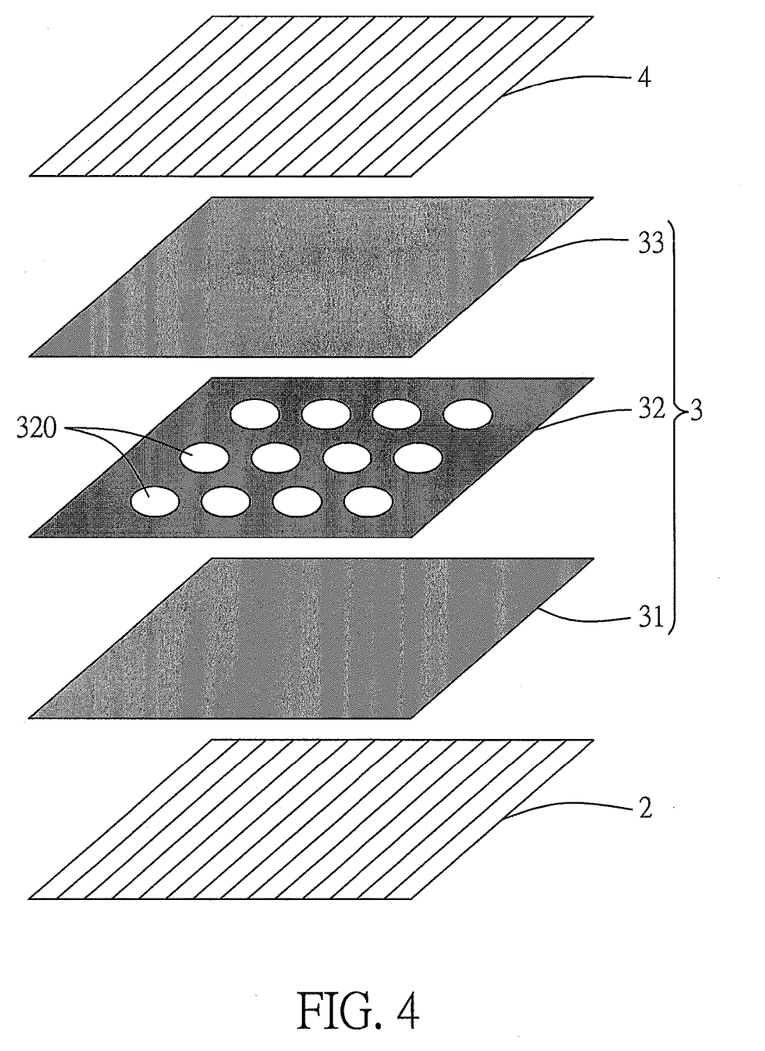
FIG. 4 is an exploded perspective view of the second embodiment.

Referring to FIGS. 3 and 4, a second embodiment of the over-current protection device according to the disclosure is illustrated. The second embodiment of the over-current protection device has a structure the same as that of the first embodiment, except that, in the second embodiment, the second polymer layer 32 includes a plurality of the through holes 320. The second polymer layer 32 may have a through hole density ranging from 4 holes/cm$^2$ to 16 holes/cm$^2$.

The following examples and comparative examples are provided to illustrate the embodiment of the disclosure, and should not be construed as limiting the scope of the disclosure.

EXAMPLE

Example 1 (E1)

10 grams of HDPE (purchased from Formosa Plastics Corp., catalog no.: HDPE9002) serving as the non-grafted olefin-based polymer, and 10 grams of unsaturated carboxylic acid grafted polyolefin (i.e., maleic anhydride grafted-HDPE (MA-G-HDPE), purchased from Dupont, catalog no.: MB100D) serving as the grafted olefin-based polymer were provided as the first and third polymer compositions of the first and third polymer layers, and 30 grams of carbon black (purchased from Columbian Chemicals Company, catalog no.: Raven 430UB, having a DBP/D of 0.95 and a bulk density of 0.53 g/cm$^3$) was provided as the particulate conductive filler of the first and third polymer layers. 20 grams of HDPE (purchased from Formosa Plastics Corp., catalog no.: HDPE9002) was provided as the second polymer composition of the second polymer layer and 30 grams of carbon black (purchased from Columbian Chemicals Company, catalog no.: Raven 430UB) was provided as the particulate conductive filler of the second polymer layer. The first, second and third polymer compositions and carbon black are shown in Table 1.

The first, second and third polymer compositions were separately compounded in a Brabender mixer with carbon black. The compounding temperature was 200° C., the stirring rate was 30 rpm, and the compounding time was 10 minutes. The compounded mixtures were separately placed in a mold and then were hot-pressed so as to form the first, second and third polymer layers 31, 32, 33, each having a thickness of 0.12 mm. The hot pressing temperature was 200° C., the hot pressing time was 4 minutes, and the hot pressing pressure was 80 kg/cm². The first and third polymer layers 31, 33, were respectively attached to two opposite surfaces of the second polymer layer 32. Subsequently, two copper foil sheets, each plated with nickel (serving as the first electrode 2 and the second electrode 4) were respectively attached to the first and third polymer layers 31, 33 oppositely of the second polymer layer 32, and were hot-pressed under 200° C. and 80 kg/cm² for 4 minutes to form a PTC polymer laminate having a thickness of 0.42 mm. The PTC polymer laminate was cut into a plurality of chips, each of which has an area size of 8 mm×8 mm. The chips were irradiated by a cobalt-60 gamma-ray generated by an irradiator with a total radiation dose of 150 kGy so as to form a plurality of test samples of Example 1 (E1).

31, 32, 33 were stacked, the second polymer layer 32 was formed with a plurality of the through holes 320 (each having a diameter of 1.0 mm and a hole area of 0.78 mm²), and had a through hole density of 9 holes/cm².

The procedures and conditions in preparing the test samples of Example 8 were similar to those of Example 4 except that, before the first, second and third polymer layers 31, 32, 33 were stacked, the second polymer layer 32 was formed with a plurality of the through holes 320 (each having a diameter of 1.0 mm and a hole area of 0.78 mm²), and had a through hole density of 9 holes/cm².

Comparative Example 1 (CE1)

The procedures and conditions in preparing the test samples of Comparative Example 1 was similar to those of

TABLE 1

| | First polymer layer | | | | Second polymer layer | | | | | Third polymer layer | | | |
|---|---|---|---|---|---|---|---|---|---|---|---|---|---|
| | First polymer composition | | | | Second polymer composition | | | | | Third polymer composition | | | |
| | HDPE wt % | MA-G-HDPE wt % | Carbon Black wt % | Thickness mm | HDPE wt % | MA-G-HDPE wt % | Carbon Black wt % | Hole | Thickness mm | HDPE wt % | MA-G-HDPE wt % | Carbon Black wt % | Thickness mm |
| E1 | 20 | 20 | 60 | 0.12 | 40 | 0 | 60 | — | 0.12 | 20 | 20 | 60 | 0.12 |
| E2 | 30 | 10 | 60 | 0.12 | 40 | 0 | 60 | — | 0.12 | 30 | 10 | 60 | 0.12 |
| E3 | 10 | 30 | 60 | 0.12 | 40 | 0 | 60 | — | 0.12 | 10 | 30 | 60 | 0.12 |
| E4 | 0 | 40 | 60 | 0.12 | 40 | 0 | 60 | — | 0.12 | 0 | 40 | 60 | 0.12 |
| E5 | 20 | 20 | 60 | 0.12 | 40 | 0 | 60 | Yes | 0.12 | 20 | 20 | 60 | 0.12 |
| E6 | 30 | 10 | 60 | 0.12 | 40 | 0 | 60 | Yes | 0.12 | 30 | 10 | 60 | 0.12 |
| E7 | 10 | 30 | 60 | 0.12 | 40 | 0 | 60 | Yes | 0.12 | 10 | 30 | 60 | 0.12 |
| E8 | 0 | 40 | 60 | 0.12 | 40 | 0 | 60 | Yes | 0.12 | 0 | 40 | 60 | 0.12 |
| CE1 | — | — | — | — | 40 | 0 | 60 | — | 0.36 | — | — | — | — |
| CE2 | 20 | 20 | 60 | 0.36 | — | — | — | — | — | — | — | — | — |
| CE3 | 30 | 10 | 60 | 0.36 | — | — | — | — | — | — | — | — | — |
| CE4 | 40 | — | 60 | 0.12 | 40 | — | 60 | — | 0.12 | 40 | — | 60 | 0.12 |
| CE5 | 20 | 20 | 60 | 0.12 | 20 | 20 | 60 | — | 0.12 | 20 | 20 | 60 | 0.12 |

"—" means not added or not existed.

Examples 2 to 4 (E2-E4)

The procedures and conditions in preparing test samples of Examples 2 to 4 were similar to those of Example 1 except for the different amounts of HDPE and MA-G-HDPE of the first and third polymer compositions of each of the test samples of E2 to E4.

Examples 5 to 8 (E5-E8)

The procedures and conditions in preparing the test samples of Example 5 were similar to those of Example 1 except that, before the first, second and third polymer layers 31, 32, 33 were stacked, the second polymer layer 32 was formed with a plurality of the through holes 320 (each having a diameter of 1.0 mm and a hole area of 0.78 mm²), and had a through hole density of 9 holes/cm².

The procedures and conditions in preparing the test samples of Example 6 were similar to those of Example 2 except that, before the first, second and third polymer layers 31, 32, 33 were stacked, the second polymer layer 32 was formed with a plurality of the through holes 320 (each having a diameter of 1.0 mm and a hole area of 0.78 mm²), and had a through hole density of 9 holes/cm².

The procedures and conditions in preparing the test samples of Example 7 were similar to those of Example 3 except that, before the first, second and third polymer layers Example 1 except that, the test samples of CE1 did not have the first and third polymer layers, the second polymer layer had a thickness of 0.36 mm, and the two copper foil sheets each plated with nickel were respectively attached to two opposite surfaces of the second polymer layer.

Comparative Examples 2 and 3 (CE2-CE3)

The procedures and conditions in preparing the test samples of Comparative Example 2 were similar to those of Example 1 except that, each of the test samples of CE2 did not have the second and third polymer layers, the first polymer layer had a thickness of 0.36 mm, and the two copper foil sheets each plated with nickel were respectively attached to two opposite surfaces of the first polymer layer.

The procedures and conditions in preparing the test samples of Comparative Example 3 were similar to those of Example 2 except that, each of the test samples of CE3 did not have the second and third polymer layers, the first polymer layer had a thickness of 0.36 mm, and the two copper foil sheets each plated with nickel were respectively attached to two opposite surfaces of the first polymer layer.

Comparative Example 4 (CE4)

The procedures and conditions in preparing the test samples of Comparative Example 4 were similar to those of Example 1 except that, the first, second and third polymer compositions of each of the test samples of CE4 were composed of HDPE. The amounts of the ingredients of the first, second and third polymer compositions and carbon black are shown in Table 1.

Comparative Example 5 (CE5)

The procedures and conditions in preparing the test samples of Comparative Example 5 was similar to those of Example 1 except that, the first, second and third polymer compositions of each of the test samples of CE5 were composed of HDPE and MA-G-HDPE. The amounts of the ingredients of the first, second and third polymer compositions and carbon black are shown in Table 1.

Performance Tests

Initial Resistance Test (Resistance at Room Temperature)

Ten test samples of each of E1-E8 and CE1-CE5 were subjected to an initial resistance test using a micro-ohm meter.

The initial resistance of each of the test samples of E1-E8 and CE1-CE5 at the temperature of 25° C. was measured. The average values of the resistances of the test samples of each of E1-E8 and CE1-CE5 are shown in Table 2. The results show that the resistance of E1 is lower than that of CE2 and CE5, and the resistance of E2 is lower than that of CE3. The results indicate that, by way of the inclusion of the second polymer layer 32, the resistance of the over-current protection device can be effectively reduced. Moreover, the results also show that the resistance of E5 is lower than that of E1, the resistance of E6 is lower than that of E2, the resistance of E7 is lower than that of E3 and the resistance of E8 is lower than that of E4, which indicate that formation of the through holes 320 in the second polymer layer 32 is able to reduce the resistance of the over-current protection device.

simultaneously have relatively low resistance and desired peel strength. Although the resistances of the test samples of CE1 and CE4 are relatively low, the peel strength thereof are lower than 0.4 kg/cm$^2$, which indicates that the first electrode 2 and the second electrode 4 are liable to be separated from the polymer layer(s).

In view of the foregoing results, with the inclusion of the first, second and third polymer layers which are made from the particular polymer compositions, the over-current protection device would exhibit low initial resistance and desired peel strength.

Resistances at Different Temperatures

Ten test samples of each of E1-E8 and CE1-CE5 were subjected to a resistance test at temperatures ranging from 25° C. to 185° C.

Figure 5:
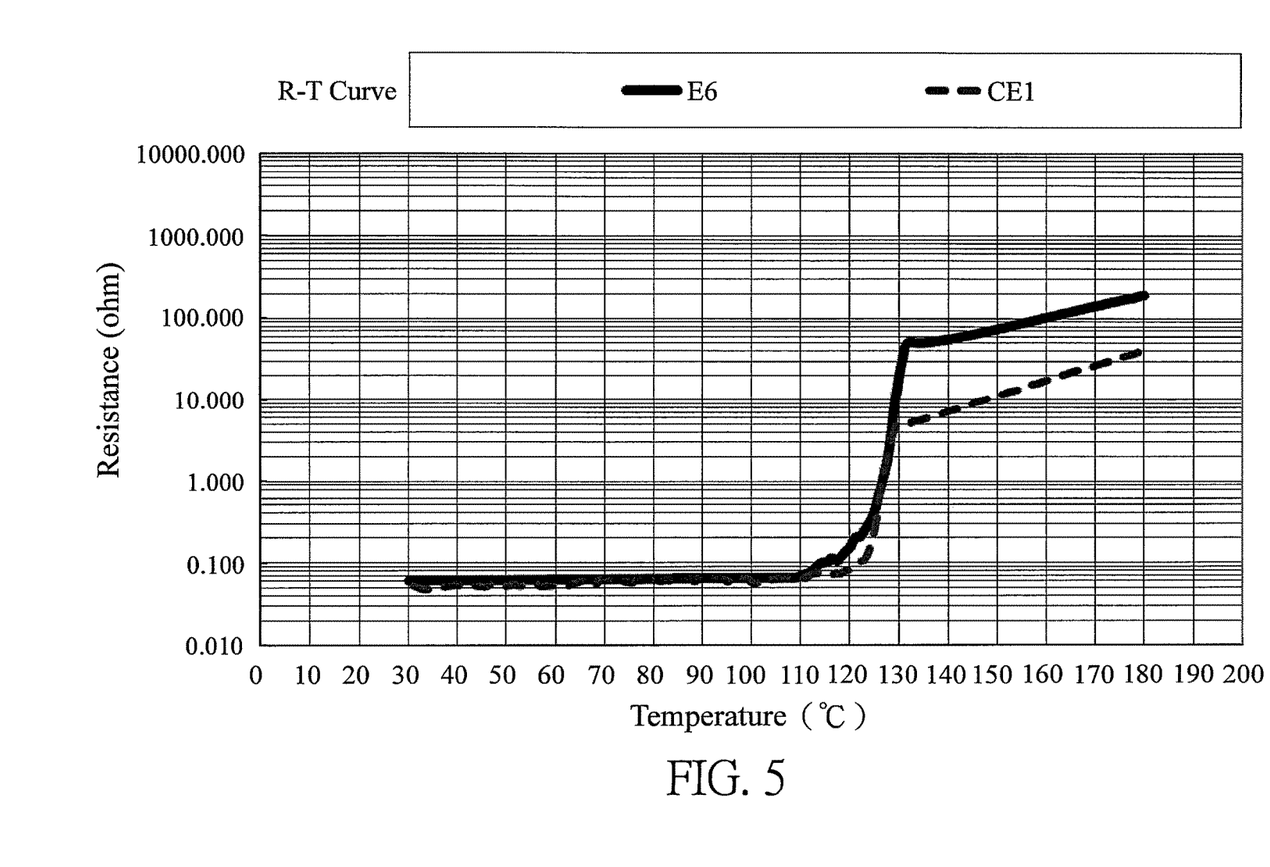
FIG. 5 is a plot showing the relationship between temperature and resistance for test samples of Example 6 and Comparative Example 1.

The resistance test for each of the test samples was conducted by increasing the temperature applied to each test sample in a stepwise manner, from an initial temperature of 25° C. to a final temperature of 185° C. under a fixed increment rate of 2° C./rain. The resistance of each of the test samples of E1-E8 and CE1-CE5 under the tested temperature was recorded. The average values of the resistance of the test samples of each of E1-E8 and CE1-CE5 at the temperature of 140° C. are shown in Table 2, and the relationship between the temperature and the resistance of the test samples of E6 and CE1 are shown in FIG. 5. The average values of the resistance of the test samples of E2 and E6 at 140° C. are 52.4 ohm and 56.71 ohm, respectively. The average values of the resistance of the test samples of CE1, CE3 and CE4 are 7.21 ohm, 9.54 ohm and 7.52 ohm, respectively, which are lower than that of E2 and E6. Moreover, the resistance of the test samples of E6 and CE1 at 25° C. is comparable to each other, while the resistance of the test samples of E6 at 140° C. is higher than that of the test samples of CE1 at 140° C.

TABLE 2

|  | Initial resistance (Ri) (ohm) | Peel strength (kg/cm$^2$) | Resistance (ohm) 140° C. | Cycle test (6000 cycles) | | Aging test (16 V) (1000 hours) | |
| --- | --- | --- | --- | --- | --- | --- | --- |
|  |  |  |  | (Rf − Ri)/Ri × 100% | Pass ratio % | (Rf − Ri)/Ri × 100% | Pass ratio % |
| E1 | 0.0138 | 2.65 | 445.28 | 55% | 100% | 439% | 100% |
| E2 | 0.0073 | 1.54 | 52.4 | 64% | 100% | 489% | 100% |
| E3 | 0.0194 | 3.34 | 621.92 | 42% | 100% | 341% | 100% |
| E4 | 0.0283 | 3.02 | 1020.17 | 69% | 100% | 495% | 100% |
| E5 | 0.0127 | 2.88 | 522.77 | 42% | 100% | 314% | 100% |
| E6 | 0.0068 | 1.57 | 56.71 | 48% | 100% | 356% | 100% |
| E7 | 0.0180 | 3.42 | 703.43 | 39% | 100% | 325% | 100% |
| E8 | 0.0265 | 3.07 | 1112.65 | 58% | 100% | 462% | 100% |
| CE1 | 0.0066 | 0.39 | 7.21 | 598% | 20% | 1104% | 10% |
| CE2 | 0.0181 | 2.62 | 245.11 | 254% | 100% | 723% | 100% |
| CE3 | 0.0106 | 1.35 | 9.54 | 285% | 30% | 974% | 20% |
| CE4 | 0.0069 | 0.36 | 7.52 | 621% | 30% | 1263% | 10% |
| CE5 | 0.0188 | 2.53 | 233.19 | 260% | 100% | 766% | 100% |

Peel Strength Test

Ten test samples of each of E1-E8 and CE1-CE5 were subjected to a peel strength test. The peel strength test was conducted by clamping the first and second electrodes 2, 4 and then pulling the first and second electrodes 2, 4 under a peel speed of 2 mm/second. The peel strength of each of the test samples of E1-E8 and CE1-CE5 was recorded. The average values of the peel strength of the test samples of E1-E8 and CE1-CE5 are shown in Table 2. The results show that the test samples of E1 to E8 have desired peel strength (higher than 1.5 kg/cm$^2$). The test samples of E2 and E6

Switching Cycle Test

Ten test samples of each of E1-E8 and CE1-CE5 were subjected to a switching cycle test. The switching cycle test was conducted under a voltage of 16 Vdc and a current of 100 A by switching each of the test samples on for 60 seconds and then off for 60 seconds per cycle for 6000 cycles. The resistances of each of the test samples before (Ri) and after (Rf) the 6000 cycles were measured. A pass ratio and a percentage of average resistance variation ((Rf−Ri)/Ri×100%) of the test samples of each of E1-E8 and CE1-CE5 were determined. The results of the switching cycle test are shown in Table 2.

The results in Table 2 show that all of the test samples of E1-E8 pass the switching cycle test. The test samples of CE1, CE3 and CE4 have relatively low pass ratio (ranging from 20% to 30%), and also have relatively low resistance at 140° C. This indicates that the test samples of CE1, CE3 and CE4 are easily damaged at a voltage of 16 Vdc.

In addition, the percentage of average resistance variation of the test samples of each of E1-E8 is significantly lower than that of CE1-CE5.

Aging Test

Ten test samples of each of E1-E8 and CE1-CE5 were subjected to an aging test. The aging test was conducted by applying a voltage of 16 Vdc and a current of 100 A to each of the test sample for 1000 hours. The resistance of each of the test samples before (Ri) and after (Rf) the 1000 hours were measured. A pass ratio and a percentage of average resistance variation ((Rf−Ri)/Ri×100%) of the test samples of each of E1-E8 and CE1-CE5 were determined. The results of the aging test are shown in Table 2.

The results show that all of the test samples of E1 to E8 pass the aging test. The test samples of CE1, CE3 and CE4 have relatively low pass ratio (ranging from 10% to 20%), and also have relatively low resistance at 140° C. This indicates that the test samples of CE1, CE3 and CE4 are easily damaged at 16 Vdc.

In addition, in the aging test, the percentage of average resistance variation of the test samples of each of E1-E8 is significantly lower than that of CE1-CE5.

To sum up, with inclusion of the first, second and third polymer layers that are composed of different and particular polymer compositions, the over-current protection device of this disclosure exhibits good electrical properties and desired peel strength.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An over-current protection device comprising:
   first and second electrodes; and
   a positive temperature coefficient (PTC) multilayered structure disposed between said first and second electrodes and including
   a first polymer layer that is bonded to said first electrode and that includes a first polymer matrix and a first particulate conductive filler dispersed in said first polymer matrix, said first polymer matrix being made from a first polymer composition;
   a second polymer layer that is bonded to said first polymer layer and that includes a second polymer matrix and a second particulate conductive filler dispersed in said second polymer matrix, said second polymer matrix being made from a second polymer composition, said second polymer layer including at least one through hole;
   a third polymer layer that is bonded to and disposed between said second polymer layer and said second electrode and that includes a third polymer matrix and a third particulate conductive filler dispersed in said third polymer matrix, said third polymer matrix being made from a third polymer composition;
   wherein said second polymer composition contains a non-grafted olefin-based polymer and is substantially free of a grafted olefin-based polymer; and
   wherein each of said first and third polymer compositions contains a grafted olefin-based polymer.

2. The over-current protection device of claim 1, wherein said through hole has a diameter ranging from 0.8 mm to 1.20 mm.

3. The over-current protection device of claim 1, wherein said second polymer layer includes a plurality of said through holes and has a through hole density ranging from 4 holes/cm$^2$ to 16 holes/cm$^2$.

4. The over-current protection device of claim 1, wherein said non-grafted olefin-based polymer of said second polymer composition is high density polyethylene (HDPE).

5. The over-current protection device of claim 1, wherein said grafted olefin-based polymer of each of said first and third polymer compositions includes an unsaturated carboxylic acid grafted polyolefin.

6. The over-current protection device of claim 1, wherein said first polymer composition further includes a non-grafted olefin-based polymer.

7. The over-current protection device of claim 6, wherein said non-grafted olefin-based polymer of said first polymer composition is high density polyethylene (HDPE).

8. The over-current protection device of claim 1, wherein said third polymer composition further includes a non-grafted olefin-based polymer.

9. The over-current protection device of claim 8, wherein said non-grafted olefin-based polymer of said third polymer composition is high density polyethylene (HDPE).

10. The over-current protection device of claim 1, wherein said grafted olefin-based polymer of said first polymer composition is present in an amount ranging from 25 wt % to 100 wt % based on 100 wt % of said first polymer composition.

11. The over-current protection device of claim 1, wherein said grafted olefin-based polymer of said third polymer composition is present in an amount ranging from 25 wt % to 100 wt % based on 100 wt % of said third polymer composition.

12. The over-current protection device of claim 1, wherein said first, second and third particulate conductive fillers are independently selected from the group consisting of carbon black, a metallic powder, a conductive ceramic powder, and combinations thereof.

13. The over-current protection device of claim 12, wherein said first, second and third particulate conductive fillers are carbon black.

\* \* \* \* \*